United States Patent [19]

Shaff

[11] Patent Number: 4,830,833
[45] Date of Patent: May 16, 1989

[54] CATALYTIC CONVERTER

[75] Inventor: Gerald H. Shaff, Branford, Conn.

[73] Assignee: Echlin Incorporated, Branford, Conn.

[21] Appl. No.: 873,970

[22] Filed: Jun. 12, 1986

[51] Int. Cl.$^4$ .............................................. B01J 8/02
[52] U.S. Cl. .................................... 422/172; 422/177; 422/181; 422/182; 60/308
[58] Field of Search .............. 422/172, 177, 181, 182; 60/308

[56] References Cited

U.S. PATENT DOCUMENTS

| | | | |
|---|---|---|---|
| 3,544,264 | 12/1970 | Hardison | 422/181 X |
| 3,701,823 | 10/1972 | Hardison | 423/213 |
| 3,702,236 | 11/1972 | Fessler | 23/288 F |
| 3,730,691 | 5/1973 | Lang et al. | 422/172 |
| 3,804,597 | 4/1974 | Inove et al. | 422/171 |
| 3,832,443 | 8/1974 | Hass | 422/177 |
| 3,874,854 | 4/1975 | Hunter, Jr. | 422/181 |
| 3,881,316 | 5/1975 | Bunda et al. | 60/302 |
| 3,920,404 | 11/1975 | Gandhi et al. | 422/181 |
| 3,929,420 | 12/1975 | Wood | 422/172 |
| 3,947,545 | 3/1976 | Ishida et al. | 423/213.7 |
| 3,957,445 | 5/1976 | Foster | 422/172 |
| 3,967,929 | 7/1976 | Tamazawa et al. | 422/177 |
| 4,105,414 | 8/1978 | Garcea | 23/288 F |
| 4,126,421 | 11/1978 | Morikawa | 422/177 |
| 4,148,860 | 4/1979 | Goedicke | 422/176 |
| 4,425,304 | 1/1984 | Kawata et al. | 422/171 |

FOREIGN PATENT DOCUMENTS

| | | | |
|---|---|---|---|
| 288188 | 1/1967 | Australia | 422/177 |
| 24905 | 7/1978 | Japan | 422/172 |

*Primary Examiner*—Barry S. Richman
*Assistant Examiner*—Jill Johnston
*Attorney, Agent, or Firm*—Wolf, Greenfield & Sacks

[57] ABSTRACT

A catalystic converter includes an annular catalyst bed containing catalyst beads and defined by inner and outer coaxial perforated tubes. An outer shell coaxial with the catalyst bed defines a passage between the outer shell and the outer perforated tube. The passage is connected to an outlet port. Exhaust gas flows radially outward through the catalyst bed and then through the passage to the outlet port. Air is injected into the passage at a selected axial location and is drawn into the catalyst bed by the reciprocating action of the engine. As a result, the single catalyst bed has an inner zone with a scarcity of oxygen which reduces oxides of nitrogen and an outer zone with oxygen present. Unburned hydrocarbons and carbon monoxide are oxidized in the outer zone.

1 Claim, 3 Drawing Sheets

CATALYTIC CONVERTER

FIELD OF THE INVENTION

This invention relates to catalytic converters for exhaust gases, and especially to catalytic converters for use with automobile engines.

BACKGROUND OF THE INVENTION

In order to meet applicable governmental emission standards, an automobile must be equipped with a device to remove noxious components from the engine exhaust. Many types of converters have been employed in the attempt to remove these noxious components. Early versions of catalytic converters were designed to oxidize carbon monoxide (CO) and various unburned hydrocarbons (HC). To accomplish this, oxygen must be introduced into the exhaust gas. In view of more stringent environmental standards, newer catalytic converters are required to reduce the oxides of nitrogen ($NO_x$) as well. That reaction, however, requires a scarcity of oxygen so that the $NO_x$ will react with the CO in the presence of a suitable catalyst to form nitrogen ($N_2$) and $CO_2$ generally in accordance with the following reaction:

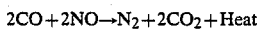

$$2CO + 2NO \rightarrow N_2 + 2CO_2 + \text{Heat}$$

Many presently available catalytic converters provide for a two-stage process wherein two separate catalyst beds are utilized: the oxides of nitrogen being reduced via the first catalyst bed, and, following the injection of air, the carbon monoxide and hydrocarbons being oxidized via the second catalyst bed. Such a device is described in Hardison U.S. Pat. No. 3,701,823, in which a first and a second catalyst bed are maintained in a heat exchange relationship, air being injected into the exhaust gas stream between the first and second catalyst bed. These prior art devices require a relatively complicated and expensive construction, including the use of two separate catalyst beds.

It is an object of the present invention to provide a catalytic converter that is capable of reducing the oxides of nitrogen, and oxidizing the carbon monoxide and unburned hydrocarbons in an exhaust gas stream.

It is another object of this invention to provide such a catalytic converter that utilizes only one catalyst bed.

It is a further object of this invention to provide such a catalytic converter that is of simple construction and is economical to manufacture.

SUMMARY OF THE INVENTION

According to the present invention, these and other objects and advantages are achieved in a catalytic converter comprising an outer shell, an input port and an output port, a catalyst bed interposed between said input port and said output port, said catalyst bed having a first zone and a second zone, whereby exhaust gas entering through the entrance port flows through the first zone of the catalyst bed, then through the second zone of said bed, and then exists through the exit port, and said converter further comprising injection means for providing air at said second zone of said catalyst bed, whereby the oxides of nitrogen in the exhaust gas are reduced in said first zone and the carbon monoxide and hydrocarbons in said exhaust gas are oxidized in said second zone.

Preferably, the catalyst bed has an annular shape defined by inner and outer perforated tubes, and the outer shell defines a passage between the outer perforated tube and the outer shell. The passasge is connected to the output port. Air is injected into the passage at a selected location along the axial dimension and is drawn into the catalyst bed by the receiprocating action of the engine. Alternatively, air can be injected into the interior of the inner perforated tube downstream of the inlet port. The injected air flows with the exhaust gas through a downstream portion of the catalyst bed.

BRIEF DESCRIPTION OF THE DRAWINGS

For a better understanding of the present invention together with other and further objects, advantages and capabilities thereof, reference may be had to the accompanying drawings in which.

DETAILED DESCRIPTION OF THE PREFERRED EMBODIMENT

Figure 1:
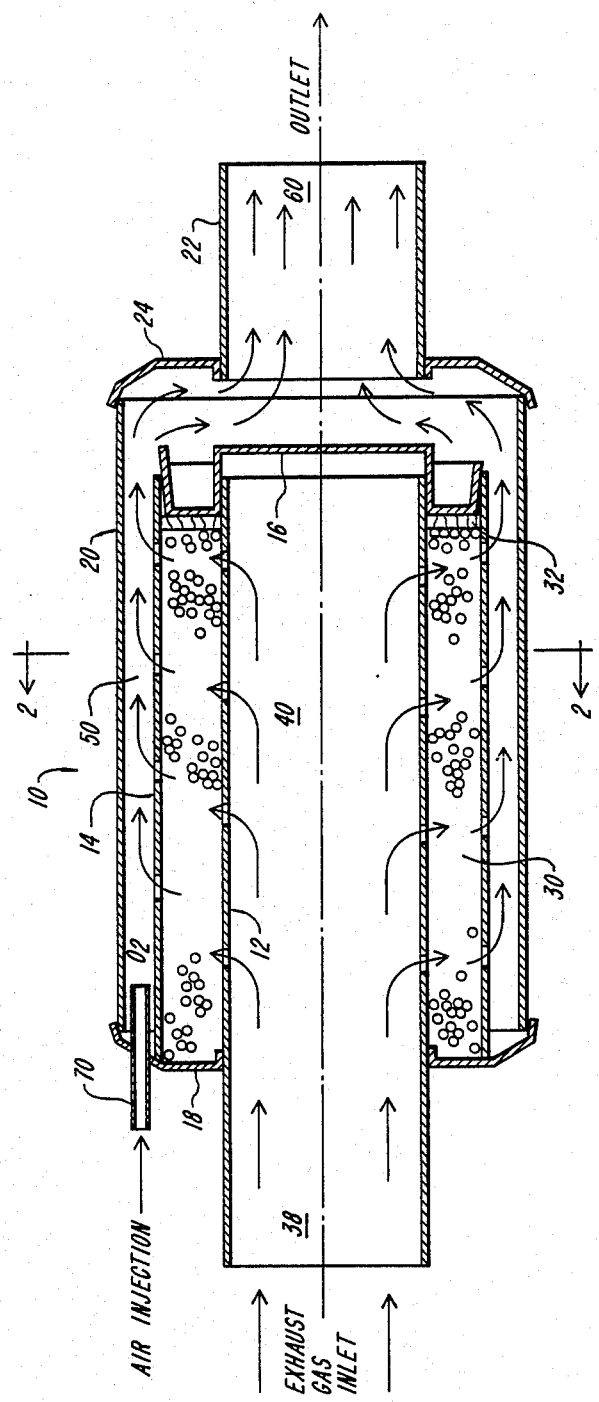
FIG. 1 is a cross-sectional view of a preferred embodiment of a catalytic converter constructed in accordance with the present invention.

In FIG. 1 is depicted a cross-sectional view of a catalytic converter 10 constructed in accordance with the preferred embodiment of the instant invention. Catalytic converter 10 is comprised of an inner perforated tube 12 and an outer coaxial perforated tube 14 spaced therefrom. An annular catalyst bed 30 is located between tubes 12 and 14. Perforated tubes 12, 14 are generally cylindrical in shape and define the annular catalyst bed 30. The space between tubes 12 and 14 is closed at one end by an annular end cap 18, and at the other by rear cartridge flange 16. Flange 16 also closes off the corresponding end of inner perforated tube 12.

An outer annular shell 20 is somewhat longer than and is spaced apart from outer perforated tube 14 to define a passageway 50 communicating with outlet tube 22, end cap 18 serving to close off one end of said passageway 50 furthest from outlet tube 22, except for air injection inlet tube 70 which serves to provide oxygen into passageway 50, as further described below. At the other end of passageway 50, annular end cap 24 closes said passageway 50 between outer shell 20 and outlet tube 22. Outlet tube 22 defines an outlet port 60, while inner tube 12 is connected gas-tight to an exhaust pipe from the engine (not shown) to form an inlet port 38 to chamber 40.

The catalyst beads positioned within bed 30 are of conventional design. These catalyst pellets or beads effect oxidation or reduction of exhaust gases so that there is a reduction in the amounts of harmful or irritant constituents of the exhaust gases. It is important that the catalyst pellets be packed tightly into the bed 30 and that voids be avoided to minimize abrading. However, voids are created because of the expansion of metal components when the converter is heated to temperatures of about 1500 degrees Fahrenheit and more and when the converter moves during the use of the automobile. It is preferable to maintain the amount of voids in the bed 30 to under four percent of volume.

Heat expansion means 32 are provided at rear end of the bed 30. These heat expansion means 32 are designed to maintain compressive pressure on the pellets and to occupy voids which otherwise would occur in the normal operation of the converter. The heat expanding means 32 preferably comprises a ceramic fiber, vermiculite and binder composition. Such a composition of material is sold by 3M Company under the trademark Interam. This material is a composite blend of alumina-silica, ceramic fibers, a vermiculite and butadiene-acrylonitrile latex binder. The function of the binder is to provide form and cohesiveness to the composition during handing. This binder, however, burns away when the composition is subjected to heat in the use of the system. The vermiculite expands with heat and occupies voids that otherwise would exist. The alumina-silica fibers function to hold the shape of the composition during high temperatures and provide integrity to the composition. In a preferred composition there is provided between 30 and 45 percent by volume of alumina-silica fibers between 45 and 60 percent by volume of the vermiculite and between 6 and 13 percent of organic fiber. In use, the heat expanding material expands to occupy the voids with the vermiculite expanding under the heat and maintaining its expanded volume.

Alternatively, the heat expanding material may comprise a steel wire mesh having the consistency of steel wool but designed to withstand the temperatures to which this system is normally subjected. Such a metal mesh may comprise a high temperature steel such as Inconel.

As described above, the reduction of the oxides of nitrogen requires a scarcity of oxygen, while the oxidation of unburned hydrocarbons and carbon monoxide requires oxygen. In accordance with the present invention, these conflicting requirements are met in separate zones of a single catalyst bed with air injection into one of the zones. Referring again to FIG. 1, air is injected through inlet tube 70 into passageway 50. Due to the reciprocating, or pulsating, operation of a typical engine, air is drawn through the perforations in outer tube 14 into an outer zone of catalyst bed 30 during at least a portion of the engine cycle. In the outer zone, the oxygen in the injected air promotes oxidation of unburned hydrocarbons and carbon monoxide in the presence of the catalyst beads. In an inner zone of the catalyst bed 30, where the injected air does not reach, the scarcity of oxygen promotes reduction of the oxides of nitrogen. Thus, both desired functions, reduction of $NO_x$ and oxidation of HC and CO, are performed in a single catalyst bed 30. As a result, the manufacturing process is simplified and the cost of catalytic converters with enhanced performance is reduced.

The air injection through the tube 70 is typically supplied from an air pump present in the vehicle. Sufficient air is required to fully oxidize the unburned hydrocarbons and carbon monoxide.

Figure 3:
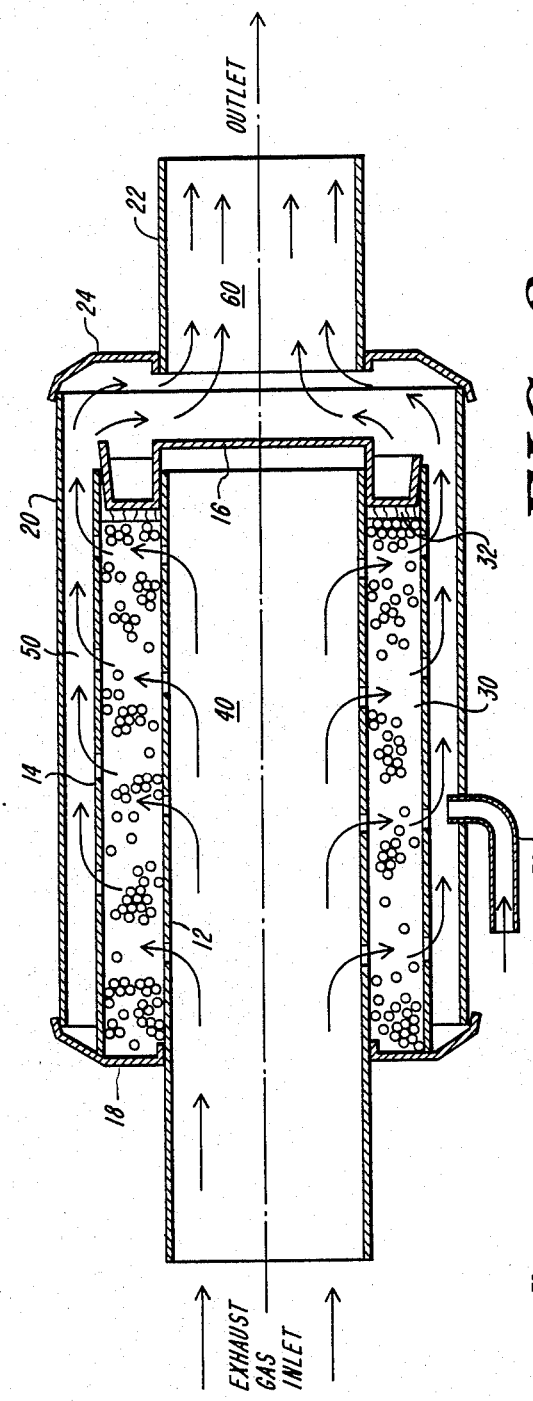
FIG. 3 is a cross-sectional view of an alternate embodiment of a catalytic converter in accordance with the present invention.
Figure 2:
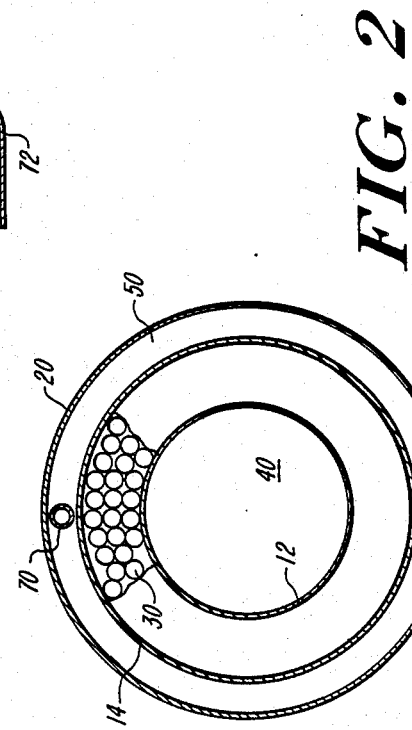
FIG. 2 is a cross-sectional view of the catalytic converter of FIG. 1, as seen along the line 2—2 of FIG. 1.

In FIG. 1, the inlet tube 70 is located at the upstream end of hte passageway 50. Thus, air is injected over the entire axial dimension of the passageway 50, permitting air to be drawn into the catalyst bed 30 to a maximum extent. Referring now to FIG. 3, there is shown a preferred embodiment of the present invention where air is injected through an inlet tube 72 located at an intermediate position along the axial length of the catalyst bed 30. Since the general gas flow direction in the passageway 50 is toward the outlet port 60, air is drawn into the catalyst bed 30 through the perforated tube 14 only in the portion axially downstream of the inlet tube 72. This position of the inlet tube 72 decreases the oxidation of HC and CO and increases the reduction of $NO_x$ since air is supplied to a smaller portion of the catalyst bed 30. It will be understood that the relative amounts of oxidation and reduction performed in the catalyst bed 30 can be controlled by movement of the location of the inlet tube 72 axially along the length of the passagseway 50. If the inlet tube 72 is located near the outlet port 60, very little oxidation of HC and CO occurs. In a preferred embodiment, the inlet tube 72 is positioned approximately one-third of the axial distance form the inlet end of the catalyst bed 30 to the outlet end thereof.

While the air injection in accordance with the present invention has been shown and described as an inlet tube at a single peripheral location in the passageway 50, it will be understood that air can be injected into the passageway 50 through two or more inlet tubes spaced around the periphery of the passageway 50, or spaced along its length, or both. In addition, air can be injected through a manifold of desired shape to improve the distribution of air flow. However, it hs been found that air injection through a single inlet tube is adequate to provide desired reduction of $NO_x$ and oxidation of HC and CO.

Figure 4:
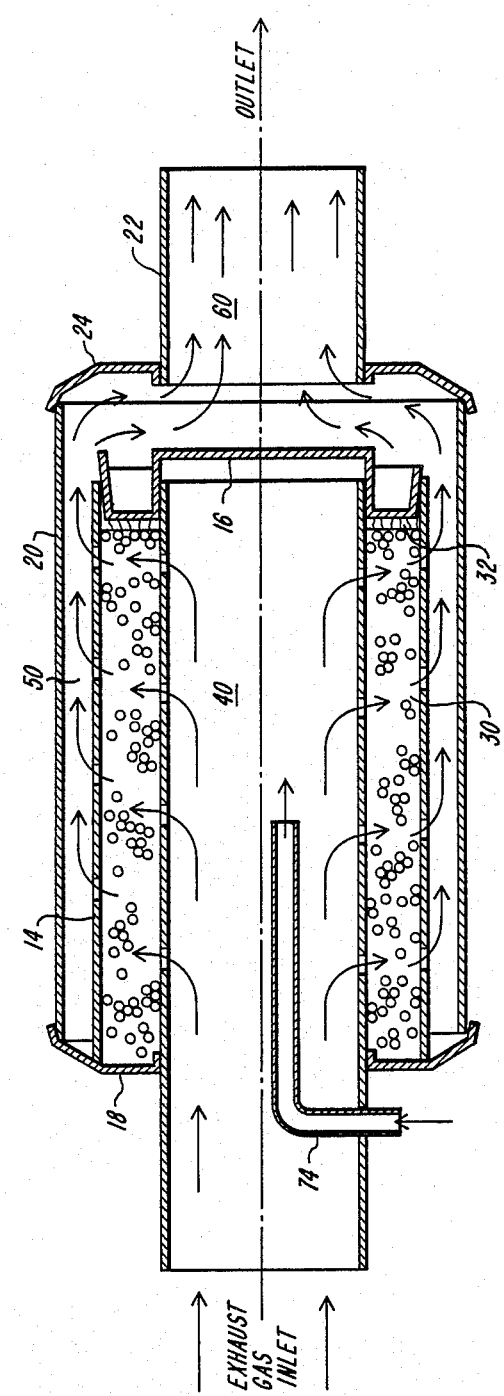
FIG. 4 is a cross-sectional view of another alternate embodiment of a catalytic converter in accordance with the present invention.

In yet another embodiment of the present invention as shown in FIG. 4, air is injected into chamber 40 inside inner perforated tube 12, axially downstream of the inlet port 38. Due to the general gas flow radially outward through catalyst bed 30, air flows with the exhaust gas into the catalyst bed 30 in the portion downstream of the inlet tube 74. The portion of the catalyst bed 30 downstream of the inlet tube 74 oxidizes unburned hydrocarbons and carbon monoxide, while the upstream portion of the catalyst bed 30 reduces oxides of nitrogen due to the scarcity of air.

In yet another feature of the present invention, the catalyst bed 30 can be constructed so that the radially inner zone adjacent the inner tube 12 contains catalyst material with characteristics which permit efficient reduction of $NO_x$ while the radially outer portion adjacent the outer perforated tube 14 contains a catalyst material which performs particularly well in oxidation of unburned hydrocarbons and carbon monoxide.

Operation of the catalytic converter of the subject invention is as follows. Exhaust gas from the engine enters chamber 40 through the inlet port 38, then flows in a generally radial direction through the walls of inner perforated tube 12 into catalyst bed 30 where it contacts the catalyst beads or pellets, resulting in the reduction of the oxides of nitrogen. At the same time, air including oxygen ($O_2$) is injected at inlet tube 70 into passageway 50 between the outer wall of outer perforated tube 14 and outer shell 20. Because of the pulsed flow of the reciprocating engine, at least some of the air will be drawn through outer perforated tube 14 into the radially outer portion of catalyst bed 30. As the exhaust gas reaches this oxygen rich section, oxidation of the hydrcarbons and carbon monoxide takes place.

While there has been shown and described what is at preesent considered the preferred embodiments of the present invention, it will be obvious to those skilled in the art that various changes and modifications may be made therein without departing from the scope of the invention as defined in the appended claims.

What is claimed is:

1. A catalytic converter for attachment to a reciprocating engine consisting essentially of:
   an annular catalyst bed containing a catalyst material capable of reducing oxides of nitrogen and oxidizing unburned hydrocarbons and carbon monoxide and defined by inner and outer perforated tubes;
   an inlet tube connected gas-tight to said inner perforated tube;
   an outer shell defining a passage between said outer shell and said outer perforated tube;
   an outlet tube connected gas-tight to said outer shell such that exhaust gas enters said converter through said inlet tube, flows generally radially through said catalyst bed to said passage and then flows through said passage to said outlet tube, said passage having a direct gas connection to said outlet tube; and
   air injection means for injecting air into said passage.

* * * * *